United States Patent [19]

Renard

[11] Patent Number: 4,532,465
[45] Date of Patent: Jul. 30, 1985

[54] ELECTROTECHNICAL DEVICE FOR REGULATING ASYNCHRONOUS ROTATING MACHINES

[75] Inventor: Michel Renard, Fleac, France

[73] Assignee: Moteurs Leroy-Somers, Angouleme, France

[21] Appl. No.: 513,004

[22] Filed: Jul. 12, 1983

[30] Foreign Application Priority Data

Jul. 16, 1982 [FR] France .................. 82 12443

[51] Int. Cl.³ .................................................. H02P 5/40
[52] U.S. Cl. ........................................ 318/814; 318/762
[58] Field of Search ............. 318/812, 814, 729, 799, 318/800, 759–762, 816, 817

[56] References Cited

U.S. PATENT DOCUMENTS

| | | |
|---|---|---|
| 2,648,808 | 8/1953 | Tiede . |
| 2,736,853 | 2/1956 | Selgin . |
| 3,141,122 | 7/1964 | Loocke . |
| 3,467,904 | 9/1969 | Studtmann . |
| 3,529,224 | 9/1970 | Bedford . |
| 3,758,837 | 9/1973 | Stauber et al. ............... 318/762 |
| 3,911,339 | 10/1975 | Rettig . |
| 3,997,825 | 12/1976 | Miyasita et al. . |
| 4,119,894 | 10/1978 | Sorensen ...................... 318/814 |
| 4,152,630 | 5/1979 | Wanlass . |
| 4,187,457 | 2/1980 | Wanlass . |
| 4,292,545 | 9/1981 | Hingorani ..................... 323/210 |
| 4,356,441 | 10/1982 | Putman et al. ................ 323/210 |

FOREIGN PATENT DOCUMENTS

| | | |
|---|---|---|
| 15624 | 9/1980 | European Pat. Off. . |
| 845979 | 8/1952 | Fed. Rep. of Germany . |
| 2353191 | 5/1975 | Fed. Rep. of Germany . |
| 553504 | 8/1974 | Switzerland . |
| 222512 | 6/1959 | United Kingdom ............ 318/729 |
| 811400 | 3/1981 | U.S.S.R. ........................ 323/205 |
| 832646 | 5/1981 | U.S.S.R. ........................ 323/208 |

Primary Examiner—David Smith, Jr.
Attorney, Agent, or Firm—Young & Thompson

[57] ABSTRACT

An electrotechnical regulating device for asynchronous rotating machines comprises capacitors in series with the windings of the asynchronous motor. In order to regulate the speed of rotation of an asynchronous motor, the device further comprises a variable-impedance short-circuiter connected in parallel between at least one of the windings and the associated capacitor or capacitors. The device serves to modify the torque of an asynchronous motor supplied at a variable frequency and at a fixed voltage, in order to control the speed of an asynchronous motor which is supplied at fixed or variable frequency or in order to regulate the voltage of an induction generator which rotates at a fixed or variable speed.

14 Claims, 19 Drawing Figures

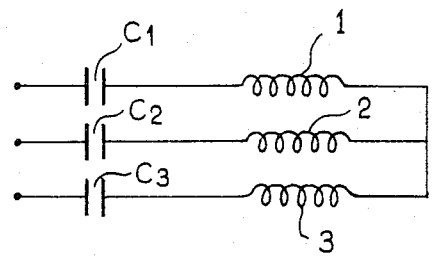
FIG_1
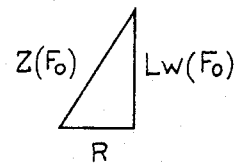
FIG_2
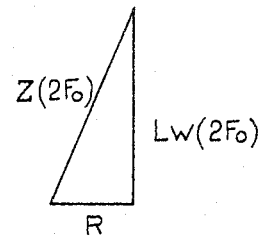
FIG_3
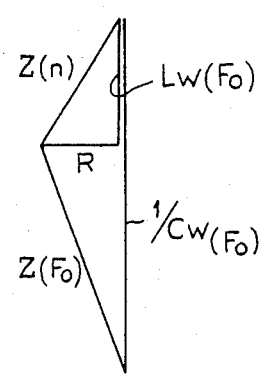
FIG_4
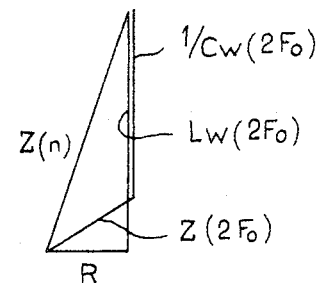
FIG_5

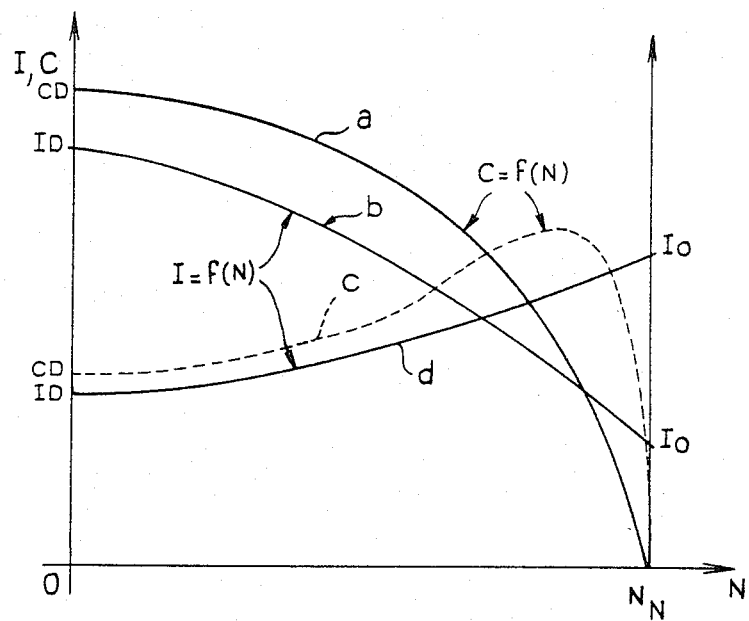
FIG_6
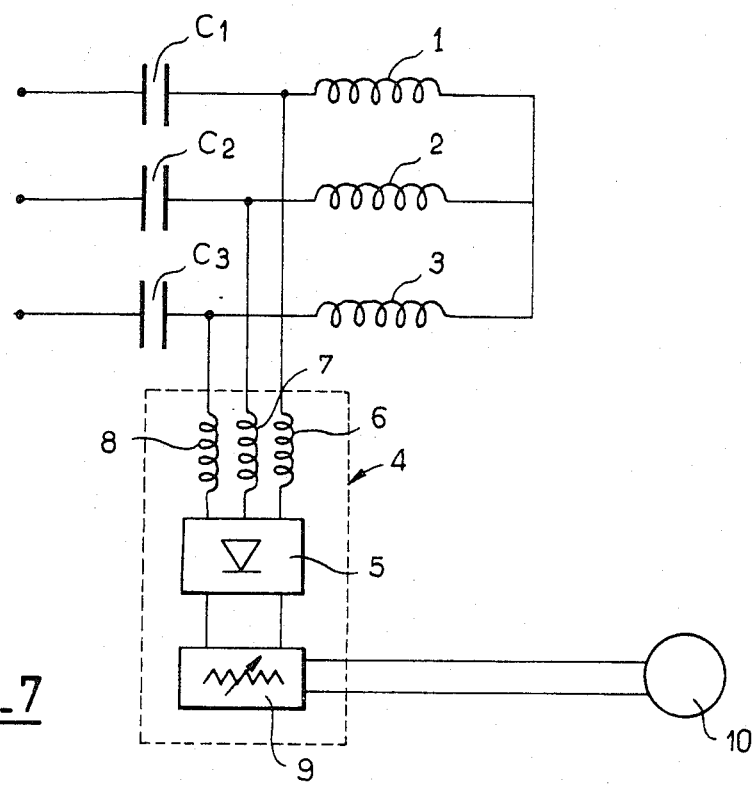
FIG_7

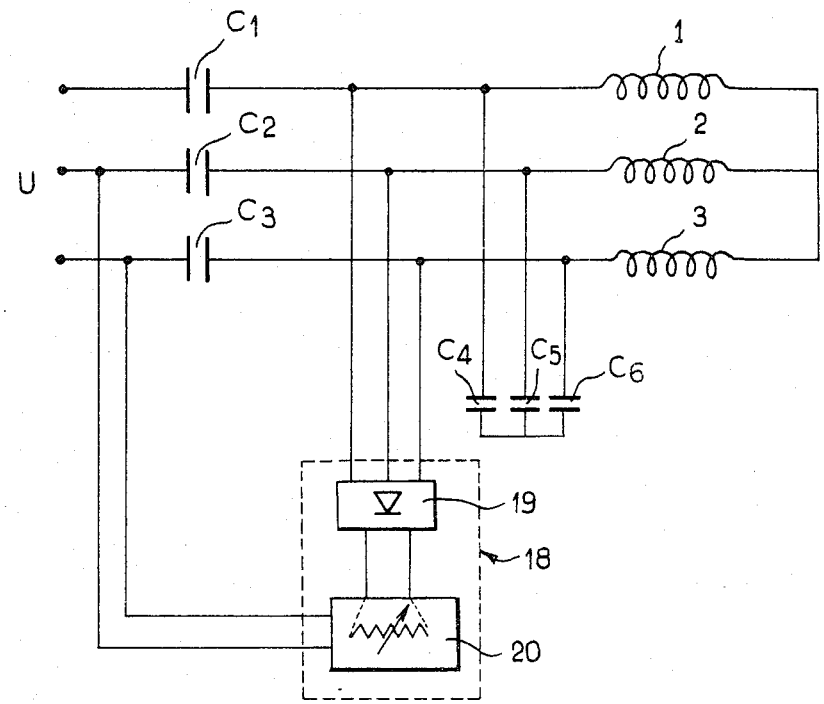
FIG_10

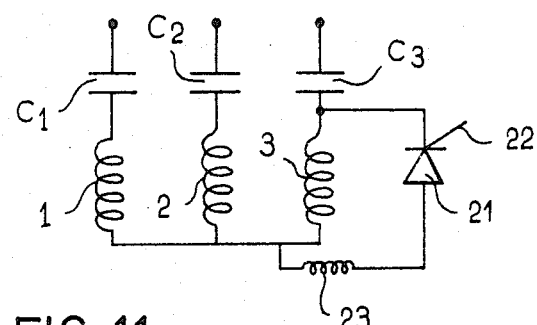
FIG_11
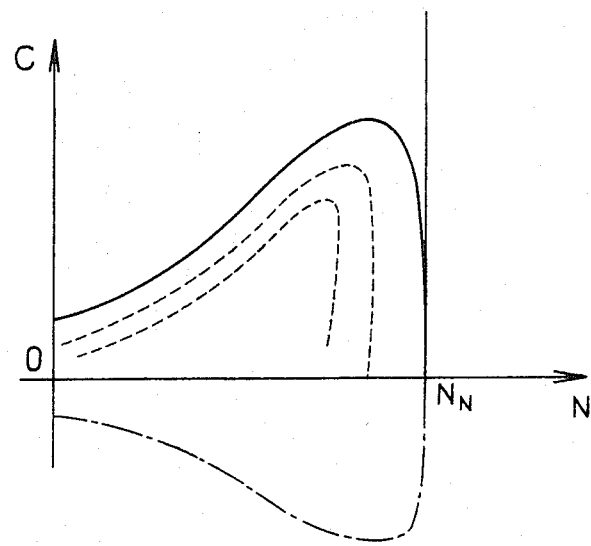
FIG_12
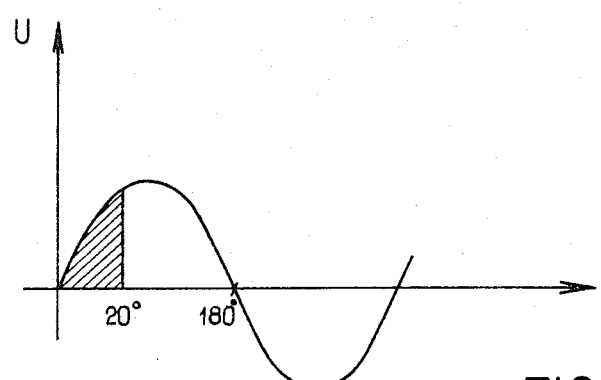
FIG_13

ELECTROTECHNICAL DEVICE FOR REGULATING ASYNCHRONOUS ROTATING MACHINES

BACKGROUND OF THE INVENTION

This invention relates to a device for regulating asynchronous rotating machines, especially motors and induction generators.

In some electrotechnical applications, motors are supplied with a fixed voltage and from a variable-frequency converter.

In this case, since the voltage remains constant, desaturation of the motor is obtained when the frequency increases, thus producing a reduction in torque.

In many applications, however, it is a desirable objective on the contrary to ensure that the torque developed by the motor increases with the frequency or at least remains constant.

One of the solutions at present adopted for the achievements of this objective consists in carrying out high-frequency chopping of the direct-current signal of the motor supply voltage by means of an electronic device and in remodulating the chopped wave, thus producing a new signal in order to obtain a ratio U (voltage)/F (frequency) which is substantially constant as a function of the speed of rotation of the motor.

However, these electronic devices suffer from the disadvantage of being very complex and therefore costly as well as producing noises and vibrations of the motor at low frequency.

SUMMARY OF THE INVENTION

One of the objects of the invention is to provide an electrotechnical regulating device which has only a small number of electronic components, which is very simple and therefore inexpensive to construct, and which is not subject to the disadvantage of producing the noises and vibrations mentioned above.

The regulating device contemplated by the invention essentially comprises capacitors connected in series with the windings of the rotating machine and having a capacitance such that the capacitance coefficient is higher than the inductance coefficient of the winding. Another distinctive feature of the regulating device lies in the fact that a variable-impedance short-circuiter is connected in parallel between at least one of the windings and the associated capacitor or capacitors.

It has been found surprisingly, especially in the case of an asynchronous motor supplied with a fixed voltage, that the simple fact of placing capacitors in series with the windings permits favorable modification of the motor torque as a function of the speed.

When the capacitance of the capacitor associated with each of the windings is such that the capacitance coefficient $1/C_w$ is higher than the corresponding inductance coefficient $L_w$ of the winding in the vicinity of synchronism of the machine, an increase in the voltage at the terminals of the machine is observed when the frequency increases, thus resulting in an increasing variation in torque as a function of said frequency.

Furthermore, by virtue of the variable-impedance short-circuiter, it is possible to control the speed of an asynchronous motor supplied at fixed frequency and subjected to a resistive torque. This device is of much simpler design than the electronic devices employed up to the present time for the achievement of this objective, such as frequency connectors or stepping devices.

The device according to the invention can also be applied to voltage regulation of induction generators which rotate at either fixed or variable speed.

As in the case of asynchronous motors, a device of this type comprises a variable-impedance short-circuiter which is connected in parallel between the generator windings and the capacitors which are connected in series with said windings.

In another embodiment of the invention as applied to a three-phase asynchronous motor, the short-circuiter is a thyristor or triac connected in parallel to the terminals of the winding of one phase of the motor.

By virtue of this arrangement, a half-wave of the voltage supplied to the aforementioned phase of the motor can be removed either completely or partially. A direct-current component appears in the winding of said phase and produces a braking action on the motor.

The speed of the motor can thus be effectively regulated simply by adjusting the setting of the thyristor or triac.

In another embodiment of the invention which is also applied to a three-phase asynchronous motor, the short-circuiter is constituted by three thyristors or triacs connected in parallel to the terminals of the windings corresponding to the three phases of the motor.

Efficiency of the braking action referred to above can thus be increased without producing a state of unbalance.

In order to eliminate objectionable transient phenomena, it is an advantage in both of the embodiments mentioned above to connect an inductance coil in series with one of the thyristors.

The invention is also applicable to a single-phase motor having star-connected or delta-connected windings, the short-circuiter being connected in parallel with the terminals of one winding.

BRIEF DESCRIPTION OF THE FIGURES

Other features of the invention will be more apparent to those skilled in the art upon consideration of the following description and accompanying drawings, wherein:

FIG. 1 is an electrical diagram of a first device in accordance with the invention and intended to equip an asynchronous motor;

FIGS. 2 and 3 are two graphs showing the variation in impedance when the frequency is doubled in the case of a motor which is not equipped with the device shown in FIG. 1;

FIGS. 4 and 5 are two graphs which are similar to those of FIGS. 2 and 3 in the case of a motor equipped with the device shown in FIG. 1;

FIG. 6 is a graph showing:

Figure 8:
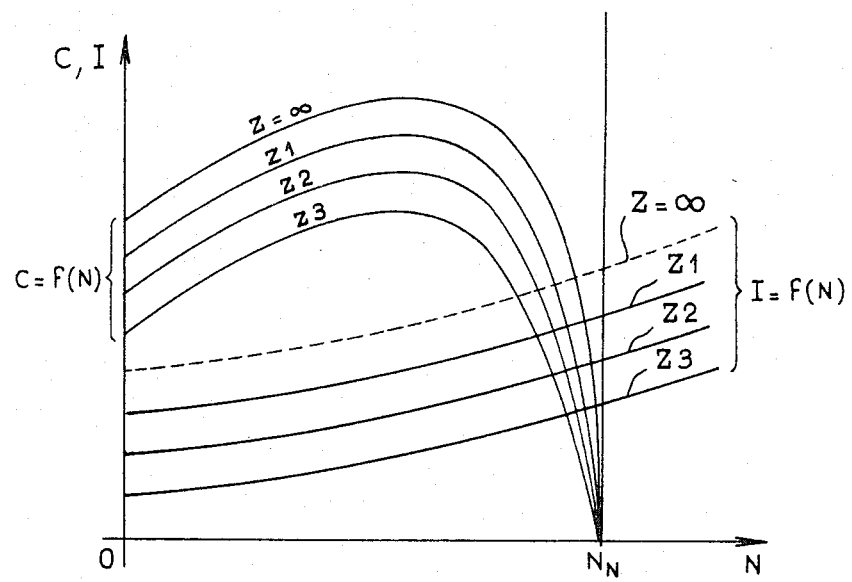
Figure 9:
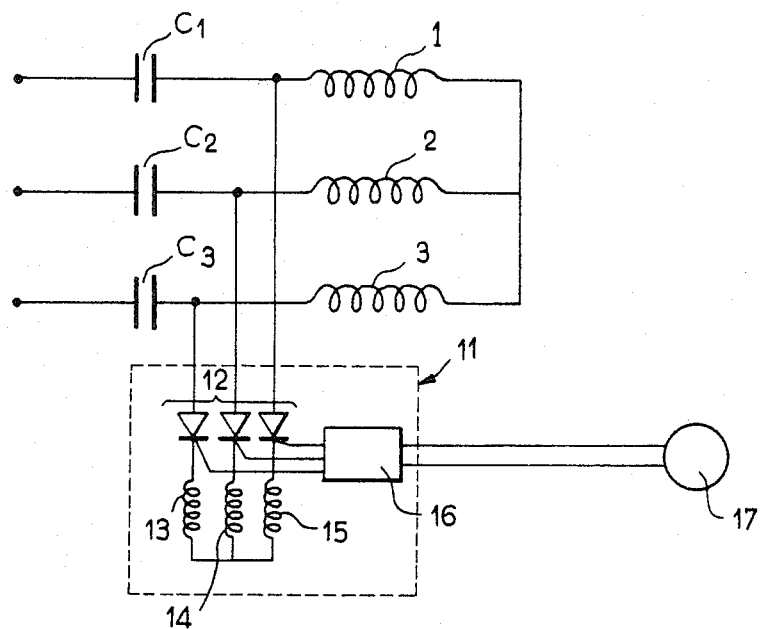
Figure 14:
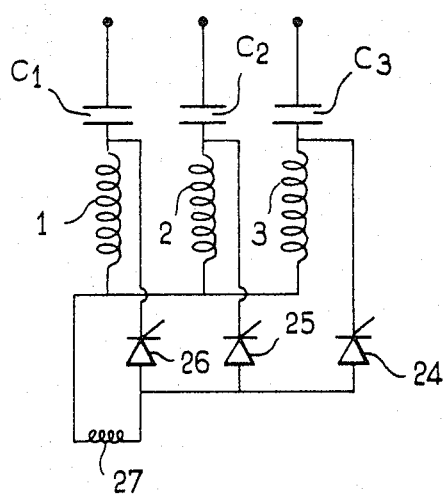
Figure 15:
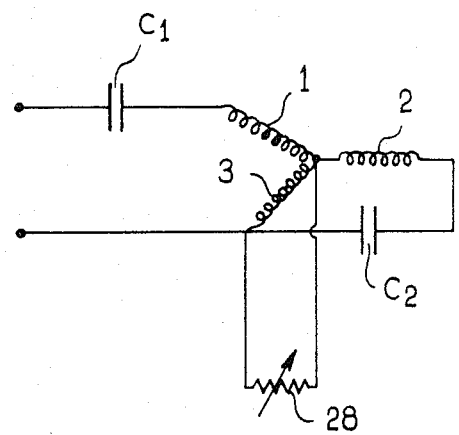
Figure 16:
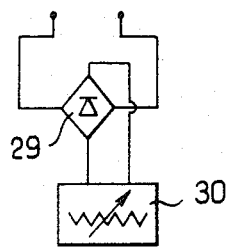
Figure 17:
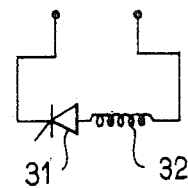
Figure 18:
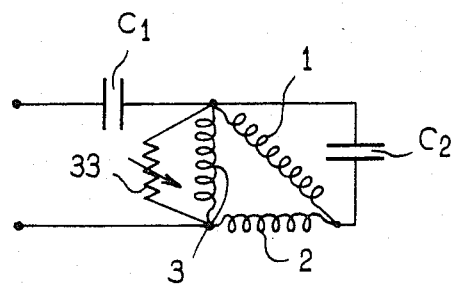
Figure 19:
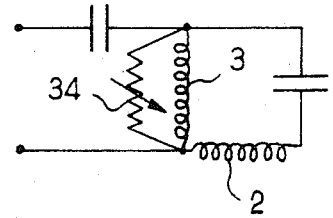

(1) in the case of a motor which is not equipped with the device in accordance with the invention, the progressive variation in torque as a function of the speed (a), and the progressive variation in current intensity as a function of the speed (b);

(2) in the case of a motor equipped with the device in accordance with the invention, the progressive variation in torque as a function of the speed (c), and the progressive variation in current intensity as a function of the speed (d). In this figure, Io is the no-load current intensity and $I_D$ is the startup current intensity;

FIG. 7 is an electrical diagram of a second device in accordance with the invention for equipping an asynchronous motor;

FIG. 8 is a curve showing the progressive variation in intensity and in torque as a function of speed in the case of a motor equipped with a device as shown in FIG. 7 in respect of different values of the short-circuiting impedance (9);

FIG. 9 is an electrical diagram of a third device in accordance with the invention for equipping an asynchronous motor;

FIG. 10 is an electrical diagram of a device in accordance with the invention for equipping an induction generator;

FIG. 11 is an electrical diagram of another embodiment of a device in accordance with the invention for equipping a three-phase asynchronous motor;

FIG. 12 is a graph showing in the case of a motor equipped with the device in accordance with FIG. 11 the progressive variation in torque as a function of speed;

FIG. 13 is a graph representing a sine-wave of the voltage applied to one of the phases of the motor and the effect of the thyristor;

FIG. 14 is an electrical diagram of a modified version of the device in accordance with the invention and comprising three thyristors in parallel with the windings of the three phases;

FIG. 15 is a diagram of a device for equipping a star-connected single-phase asynchronous motor;

FIG. 16 is a diagram of a short-circuiter for equipping the device in accordance with FIG. 15;

FIG. 17 is a diagram of another short-circuiter for equipping the device shown in FIG. 15;

FIG. 18 is a diagram of a device for equipping a delta-connected single-phase asynchronous motor and;

FIG. 19 is a diagram of a device for equipping a true single-phase asynchronous motor.

DETAILED DESCRIPTION

In FIG. 1 there are shown the three windings 1, 2, 3 of a three-phase asynchronous motor. These three windings 1, 2, 3 can be either star-connected or delta-connected.

It will be postulated that the synchronous SAID motor is supplied with a fixed direct-current voltage and that it is associated with a frequency converter for varying the speed of rotation of the motor.

In this example, the regulating device comprises capacitors $C_1$, $C_2$, $C_3$ connected in series respectively to the terminals of the windings 1, 2, 3.

When these three capacitors $C_1$, $C_2$, $C_3$ are not present and when the frequency increases from a value $F_o$ to a frequency $2F_o$ having double the value (see FIGS. 2 and 3), the inductance $Lw$ of the circuit (namely that of the windings 1, 2, 3) increases from a value $Lw$ ($F_o$) to an inductance $Lw$ ($2F_o$) which has double the value since the angular frequency $w$ is proportional to the frequency $w=2\pi F$.

Similarly, the impedance $Z$ ($F_o$) increases to $Z=(2F_o)$. The current intensity I decreases between a value equal to $U/Z$ ($F_o$) and a value $U/Z$ ($2F_o$). By virtue of the fact that the impedance has considerably increased, the current intensity decreases rapidly as a function of the increase in frequency or in other words of the speed N of the motor as is apparent from curves a and b of FIG. 6. The system is limited since the driving torque decreases whereas the resisting torque progressively increases.

The technical effect of the regulating device in accordance with the invention will now be explained with reference to FIGS. 4 and 5.

When the frequency varies between the values $F_o$ and $2F_o$, the inductance coefficient $Lw$ of the impedance increases from a value $Lw$ ($F_o$) (as shown in FIG. 4) to a double value $Lw$ ($2F_o$) as indicated in FIG. 5.

On the other hand, the capacitance coefficient decreases from a value equal to $1/Cw$ ($F_o$) to a lower value $1/Cw$ ($2F_o$). The graphs of FIGS. 4 and 5 also show that the impedance Z decreases.

The current intensity I increases from a value equal to $U/Z$ ($F_o$) to a value equal to $U/Z$ ($2F_o$). Thus the capacitors $C_1$, $C_2$, $C_3$ have the effect of compensating for the inductance coefficient $Lw$ by means of a capacitance coefficient $1/Cw$ of opposite sign.

It is therefore observed that, when the coefficient $1/Cw$ is higher than the coefficient $Lw$ as is the case in FIGS. 4 and 5, the current intensity increases as a function of the frequency or in other words of the speed N as shown by the curve d of FIG. 6, in contrast to the situation observed in the absence of the capacitors $C_1$, $C_2$, $C_3$ (curves a and b).

At the same time, the torque C increases as a function of the speed N of FIG. 6 (see curve c).

It is apparent that, by making a judicious choice of capacitance of the capacitors $C_1$, $C_2$, $C_3$, it can consequently be ensured that the torque developed by the motor is constant or that said torque increases as a function of the speed.

Experience has shown that excellent results are obtained when the capacitance of the capacitors $C_1$, $C_2$, $C_3$ is chosen so that the coefficient $1/Cw$ is equal approximately to double the value of the coefficient $Lw$ when the motor rotates under no load.

The device in accordance with the invention as illustrated in FIG. 1 therefore provides a simple means of ensuring that the torque of an asynchronous motor supplied with a fixed voltage and a variable frequency either increases or remains constant as a function of the speed.

It proves necessary, however, to adapt the natural form of motors to be equipped with a device in accordance with the invention.

Moreover, the regulating device in accordance with the invention has the advantage of limiting the current intensity I of the motor, especially at the time of startup, with the result that the motor is protected against any danger of damage resulting from overheating, especially at low running speeds.

It should also be noted that, in contrast to known electronic regulating devices, the device in accordance with the invention does not produce any abnormal noise or vibration during operation of the motor, even at low frequency.

Another advantageous feature of the device in accordance with the invention lies in the fact that it has very low power consumption.

The characteristics of a regulating device in accordance with the invention, the diagram of which corresponds to that of FIG. 1, are given below by way of example without any limitation being implied.

Power of the motor: 500 to 1200 W.
Supply voltage: 20 V.
Frequency: 54 Hz to 87 Hz
Cos $\phi$ at 54 Hz: 0.8 front Efficiency at 54 Hz: 0.7.
Cos φ at 67 Hz: 0.78 front
Efficiency at 87 Hz: 0.75.

By way of comparison, in the case of a device corresponding to the characteristics given above but not provided with compensating means, that is to say without any capacitor in series with the windings, the following characteristics are obtained :

Cos φ at 54 Hz: 0.46 rear  
Efficiency at 54 Hz: 0.51 } (Supersaturated motor)

Cos φ at 87 Hz: 0.86 rear  
Efficiency at 87 Hz: 0.55 } (Desaturated motor)

It is therefore observed that the values of cos φ and of efficiency are more favorable in the case of the device in accordance with the invention both at low frequency and at high frequency.

In the diagram of FIG. 7 there are again shown the three windings 1, 2, 3 of an asynchronous motor and the three capacitors $C_1$, $C_2$, $C_3$ which are connected in series with said windings as in the case of the device shown in FIG. 1.

The device which is illustrated in FIG. 7 further comprises a variable-impedance short-circuiter 4 connected in parallel between the windings 1, 2, 3 and the capacitors $C_1$, $C_2$, $C_3$ in series.

In the example of FIG. 7 which is applied to the case of a motor having a power rating lower than or equal to approximately 10 kW, the short-circuiter 4 comprises a diode bridge rectifier 5, the terminals of which are each connected in parallel to one terminal of the windings 1, 2, 3 through an inductance coil 6, 7, 8 or through an auxiliary coil.

The diode bridge rectifier 5 is also connected to a variable resistor 9 which serves to vary the impedance of the short-circuiter 4.

The variable impedance 9 can be controlled either manually or automatically by means of a regulator in dependence on a detection device 10 which has the function of sensing physical quantities such as, for example, the speed or delivery of a pump or fan, or the temperature of an enclosure.

In the diagram of FIG. 8, the progressive variation in current intensity I and in motor torque C is plotted as a function of the impedance of the short-circuiter of the motor. The dashed-line curve represents the case in which the short-circuiter 4 would have an infinite impedance or else would be non-existent, which would restore the device to the case shown in FIG. 1.

The three full-line curves represent the progressive variation in current intensity I of the motor torque C in respect of three different values of the impedance $Z_1$, $Z_2$, $Z_3$ of the short-circuiter 4. Irrespective of the value of impedance, the current intensity I increases with the speed, with the result that the torque increases with the speed of the motor as in the case of the device shown in FIG. 1.

It is apparent that, by varying the impedance of the short-circuiter 4, the current intensity I and the torque of the motor are modified.

Similarly, when the asynchronous motor is supplied at fixed values of voltage and frequency, the speed of the motor can be regulated by modifying the value of the impedance (4).

In the event that the variation in impedance is controlled automatically by the detection device or sensor 10, the impedance 4 acts as a veritable electronic regulator of very simple construction which controls the speed of the motor in dependence on a predetermined parameter such as the speed or delivery of a pump or fan, or the temperature of an enclosure.

As in the case of the device shown in FIG. 1, the device illustrated in FIG. 7 protects the motor against any danger of overheating by virtue of the fact that the current intensity is maintained at an acceptable value in all circumstances, especially in the event of overload.

FIG. 9 illustrates a device which is similar to that of FIG. 6 but is better suited to motors which have a power rating above 10 kW approximately.

In this embodiment, the variable-impedance short-circuiter 11 comprises three triacs 12 connected on the one hand directly to the terminals of the windings 1, 2, 3 and on the other hand to,inductance coils or to an auxiliary coil 13, 14, 15. The triacs 12 are controlled by the regulator 16 which is adjusted either manually or automatically by means of a sensor 17 as in the case of the device shown in FIG. 7.

The invention is also applicable to voltage regulation of induction generators which rotate at either fixed or variable speed.

In the embodiment of FIG. 10 as in the case of the preceding figures, capacitors $C_1$, $C_2$, $C_3$ are connected in series to the terminals 1, 2, 3 of an induction generator.

The capacitors $C_1$, $C_2$, $C_3$ are connected in series with the windings 1, 2, 3 of an induction generator. The capacitors $C_1$, $C_2$, $C_3$ compensate for the internal impedance of the generator.

Capacitors $C_4$, $C_5$, $C_6$ for no-load excitation of the generator are also connected to the terminals of the windings 1, 2, 3.

Between the capacitors $C_4$, $C_5$, $C_6$ and the capacitors $C_1$, $C_2$, $C_3$ is connected in parallel a variableimpedance short-circuiter 18 which comprises a diode bridge rectifier 19 and a variable resistor 20 as in the case of the device shown in FIG. 7.

The variable impedance 18 can be controlled by hand or adjusted automatically by means of a regulator in dependence on the voltage U delivered by the induction generator.

In the embodiment of FIG. 11 as in the previous instances, capacitors $C_1$, $C_2$, $C_3$ are connected in series with the windings 1, 2, 3 of a three-phase asynchronous motor and their capacitance is higher than the inductance of the motor windings.

In this example, a thyristor 21 is connected in parallel to the terminals of the winding 3 of one of the phases of the motor. The thyristor 21 provided with a trigger 22 is associated with an electric circuit of a type known per se which serves to adjust its "angle" between 0° and 180°.

When the thyristor 21 is set at the zero angle, the general principle of operation in this case is exactly the same as if the thyristor did not exist and the motor torque C as a function of the speed N describes the full-line curve of FIG. 12.

When the thyristor 21 is set at the angle of 180°, one half-wave of the voltage U which passes within the winding 3 is completely suppressed. In this case, only the direct-current component of the voltage passes within the winding 3 and produces a field at the rotor of the motor which acts in opposition to the motor field as in the case of eddy currents.

There is thus produced a negative torque as represented by the chain-dotted line in FIG. 12. In this example, the braking torque can represent a proportion of up to 40% of the rated torque of the motor.

By setting the thyristor 21 at intermediate angles such as 10° or 20°, for example, only part of the half-wave is suppressed (as shown in the hatched portion of FIG. 13) and torque curves of lower value than that of the maximum torque are obtained (as indicated by the dashed-line curves in FIG. 12). However, the value also increases as a function of the speed N. It is therefore apparent that the thyristor 21 makes it possible to regulate the speed of the motor in a very simple and effective manner.

The device shown in FIG. 11 is more effective than the device described earlier with reference to FIGS. 7 and 9 although it does introduce an apparent unbalance of approximately 20% in the phase current of the winding 3. Thus unbalance nevertheless remains acceptable.

In order to prevent any interference caused by transient phenomena, it is possible to connect a small choke coil 23 in series with the thyristor 21.

The thyristor 21 can be replaced by a triac. In this case, there is obtained a regulating device which has lower power but introduces a smaller degree of magnetic unbalance than is the case when making use of a thyristor.

In the embodiment of FIG. 14, the short-circuiter of the device is constituted by three thyristors 24, 25, 26 connected in parallel with the terminals of the windings 1, 2, 3 corresponding to the three phases of the motor.

The effect of these three thyristors 24, 25, 26 thus applies to the three phases of the motor. It is possible in this case to obtain a braking torque which exceeds that of the maximum torque by 100%.

The advantage of this device in comparison with the preceding embodiment is that it is perfectly balanced.

Moreover, since the three thyristors are conducive to greater effectiveness, this device is applicable to motors having a power rating which exceeds 10 kW. Furthermore, this device makes it possible to obtain lower magnetic noise than that of FIG. 11.

As in the case of the device shown in FIG. 11, the device of FIG. 14 can be provided with an inductance coil 27 in series with one of the thyristors such as the thyristor 26 in order to remove interferences caused by transient phenomena.

The device in accordance with the invention also finds an application in single-phase asynchronous motors.

FIG. 15 illustrates the case of a single-phase motor in which the windings 1, 2, 3 are arranged in a star-connected circuit. In this embodiment, a capacitor $C_1$ is connected in series with the winding 1 and a capacitor $C_2$ is provided between the windings 2 and 3. As in the previous embodiment, the capacitors $C_1$ and $C_2$ have a total capacitance which exceeds the inductance of the windings 1, 2, 3.

In this embodiment, a short-circuiter 28 constituted by a variable impedance is connected in parallel with the terminals of the winding 3. The variable impedance can be replaced by a diode bridge 29 in parallel with a variable resistor 30 (as shown in FIG. 16) or by a thyristor 31 in series with an inductance coil 32 (as shown in FIG. 17).

In the case of FIG. 18, the device relates to a single-phase motor having delta-connected windings 1, 2, 3. A variable impedance 33 is connected in parallel across the terminals of the winding 3.

In the case of FIG. 19, the device relates to a true single-phase motor comprising two windings 2, 3 and a variable impedance 34 connected in parallel with the winding 3.

In the embodiments of FIGS. 18, 19, the variable impedance 33, 34 can be replaced by the arrangement of FIG. 16.

The effect of the capacitors $C_1$, $C_2$ and of the short-circuiters (28), (29, 30), (31, 32), (33, 34) in the single-phase motors is the same as in the case of the three-phase motors.

In all cases, the device in accordance with the invention has higher performances than the stepping devices employed up to the present time for regulating the speed of asynchronous motors.

As will readily be apparent, the invention is not limited to the examples of application described in the foregoing and any number of modifications may accordingly be contemplated without thereby departing from the scope of the invention.

From this it follows that the invention is applicable in all cases in which it is desired to modify the torque of an asynchronous motor which is supplied at variable frequency and at a fixed voltage, to control the speed of a motor supplied at a fixed or variable frequency, or to regulate the voltage of an induction generator which rotates at a fixed or variable speed.

What is claimed is:

1. An electrotechnical device for regulating asynchronous rotating machines having a plurality of windings, comprising
   (a) a plurality of capacitors connected in series with the plurality of windings, respectively, the capacitance of said capacitor associated with each winding being such that the coefficient of capacitance (1/Cw) is substantially greater than the coefficient of inductance (Lw) corresponding with the associated winding; and
   (b) variable impedance short circuit means connected in parallel with at least one of the windings, whereby the torque of the asynchronous rotating machine is modified, thereby to regulate the speed of rotation.

2. A device according to claim 1 as applied to speed regulation of asynchronous motors, wherein the coefficient of capacitance 1/Cw is equal to approximately twice the value of the coefficient of inductance Lw.

3. A device according to claim 1 wherein said short circuit means comprises a diode bridge rectifier whose terminals are each connected in parallel to one terminal of the windings through a said diode bridge rectifier being connected to a variable resistor.

4. A device according to claim 1 wherein said short circuit means comprises triacs connected to the terminals of the winding, said triacs being in turn connected to a coil.

5. A device according to claim 3 wherein the variable impedance is self-controlled by a sensing device for controlling the speed of the motor in dependence on the parameter detected by said sensing device.

6. A device according to claim 1 as applied to voltage regulation of induction generators, wherein said device comprises a variable-impedance short-circuit means connected between the series capacitors and the no-load excitation capacitors which are connected in parallel to the terminals of the windings.

7. A device according to claim 6, wherein the short circuit means is a diode bridge rectifier connected to a variable resistor.

8. A device according to claim 7, wherein the variable impedance is adjusted by a regulator controlled in dependence on the voltage delivered by the induction generator.

9. A device according to claim 1, wherein said short-circuit means is one of a thyristor and a triac connected in parallel to the terminals of the winding of one of the phases of a three-phase motor.

10. A device according to claim 1 wherein the short-circuit means is constituted by one of three thyristors and three triacs connected in parallel across the terminals of the windings corresponding to the three phases of a three-phase motor.

11. A device according to claim 9, wherein an inductance coil is connected in series with one of the thyristors.

12. A device according to claim 1, wherein said short-circuit means is connected in parallel across the terminals of one single-phase motor winding.

13. A device according to claim 4, wherein the variable impedance is self-controlled by a sensing device for controlling the speed of the motor in dependence on the parameter detected by said sensing device.

14. A device according to claim 10, wherein an inductance coil is connected in series with one of the thyristors.

* * * * *